Figure 1:
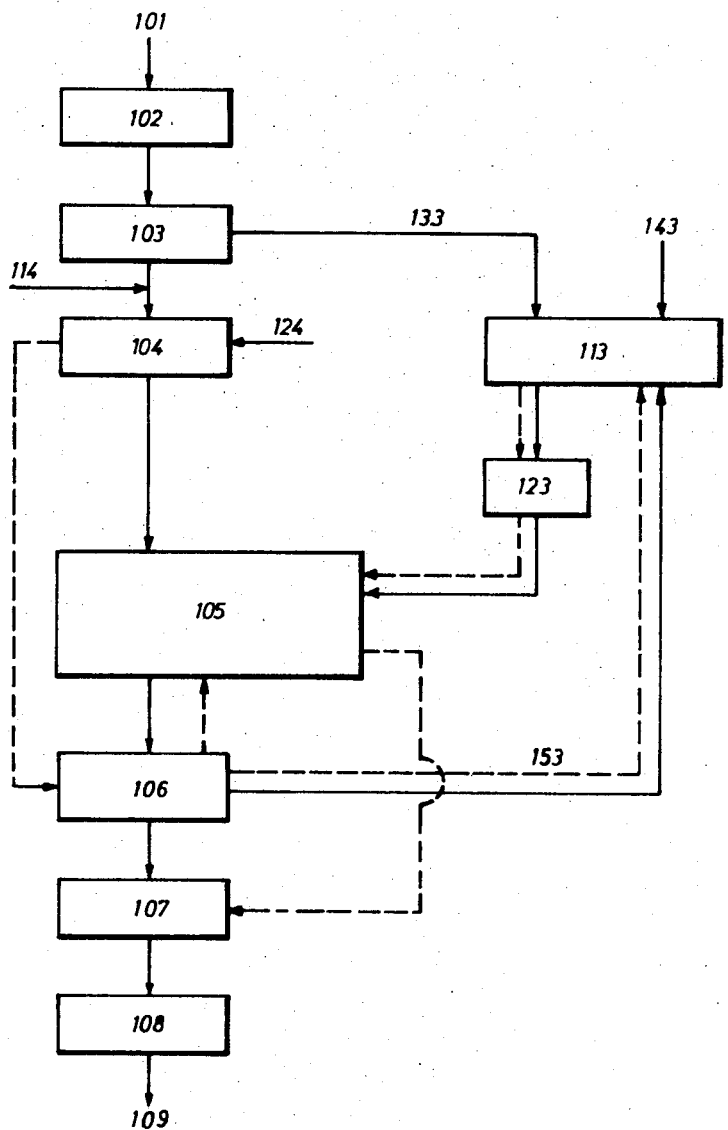

United States Patent [19]

Kienast et al.

[11] 3,728,431
[45] Apr. 17, 1973

[54] PRODUCTION OF TITANYL SULFATE SOLUTIONS

[75] Inventors: Gerhard Kienast; Heribert Stutgens; Hans-Gunter Zander, all of Krefeld, Germany

[73] Assignee: Farbenfabriken Bayer Aktiengesellschaft, Leverkusen, Germany

[22] Filed: Mar. 17, 1971

[21] Appl. No.: 125,153

[30] Foreign Application Priority Data

Mar. 28, 1970 Germany..................P 20 15 155.7

[52] U.S. Cl..................423/69, 423/86, 423/544, 423/558, 423/615, 423/659
[51] Int. Cl...........................C01g 23/00, C01g 23/04
[58] Field of Search..................23/117, 126, 202; 423/69, 85, 86, 544, 558, 615, 616, 659

[56] References Cited

UNITED STATES PATENTS

| | | | |
|---|---|---|---|
| 1,831,852 | 11/1931 | Farup | 23/117 X |
| 2,309,988 | 2/1943 | Ryan et al. | 23/117 |
| 2,794,702 | 6/1957 | Allan et al. | 23/117 |
| 2,850,357 | 9/1958 | Myers et al. | 23/117 |
| 3,218,131 | 11/1965 | Grose et al. | 23/202 R |
| 3,341,291 | 9/1967 | Mabbs et al. | 23/202 R |
| 3,441,373 | 4/1969 | Bonsack | 23/117 X |
| 3,486,847 | 12/1969 | Steinhausen | 23/117 |
| 3,615,204 | 10/1971 | Libera et al. | 23/117 |

Primary Examiner—Edward Stern
Attorney—Burgess, Dinklage & Sprung

[57] ABSTRACT

A titanium- and iron-containing slag is ground, the iron is magnetically separated and the balance is decomposed with sulfuric acid to produce a titanyl sulfate solution which is further treated to render it suitable for preparation of superior titanium dioxide pigments.

Specifically, a portion of the ultimate titanyl sulfate solution is subjected to reduction by the addition thereto of magnetically separated iron and sulfuric acid, the reduction being carried out to give a titanium(III)content of about 50 to 90 grams per liter calculated as $TiO_2$. This reduced solution is added to the titanyl sulfate solution produced by sulfuric acid decomposition of the relatively iron-free slag, their relative proportions being such as to provide a titanium (III) content of 0.1 to 4 grams per liter calculated as $TiO_2$. This prevents formation of trivalent iron which would pose a problem during later production of pigment. A portion of the resultant solution is then recycled for reduction of titanium IV to titanium (III) by additional iron and sulfuric acid.

6 Claims, 3 Drawing Figures

3,728,431

INVENTORS:
GERHARD KIENAST, HERIBERT STÜTGENS, HANS GÜNTER ZANDER.
BY
Burgess, Dinklage & Sprung Gerhard Kienast, Heribert Stütgens, Hans Günter Zander — INVENTORS Burgess, Dinklage & Sprung

PRODUCTION OF TITANYL SULFATE SOLUTIONS

According to U.S. Pat. No. 2,531,926, titanium slags which contain about 65 to 90 percent of $TiO_2$, 1 to 16 percent of metallic iron and iron compounds and 8 to 20 percent of oxides such as silicic acid, calcium oxide, magnesium oxide and/or aluminum oxide are decomposed with concentrated sulfuric acid. In this process, the slag which has been finely ground in a ball mill is reacted with sulfuric acid without the metallic iron being first removed. This process has the disadvantage that the metallic iron still contained in the slag reacts with the sulfuric acid used for decomposition to form hydrogen which may be produced in such large quantities that the lower limit of explosion is exceeded.

In the decomposition of titanium slags with sulfuric acid, soluble sulfates are formed which are present in a solid form known as "decomposition cake." The reduced titanium compounds originally present in the titanium slag, amounting to about 10 percent, are usually oxidised completely under the conditions of decomposition into Ti(IV) compounds. By extracting this residue with water, a strong sulfuric acid solution is obtained which contains mainly titanyl sulfate and ferrous sulfate. This solution is clarified and filtered and may than be concentrated if desired. As is well known, the titanium sulfate solution obtained in the so-called sulfate process for the production of titanium dioxide pigments by decomposition of titanium slag with sulfuric acid followed by dissolving the decomposition cake is reduced by the introduction of metallic iron, e.g., iron scrap. The $Fe^{3+}$ ions are first converted into $Fe^{2+}$ ions because the salts of divalent iron do not hydrolyze so readily as the salts of trivalent iron, i.e., they are not decomposed by hydrolysis under the conditions of the subsequent hydrolysis of the titanium salts by heat, and therefore cannot contaminate the titanium hydrolysate. In order to ensure that no more $Fe^{3+}$ ions will occur, it is customary to continue the reduction to the stage where a small amount of $Ti^{3+}$ ions is still present after hydrolysis (U.S. Pat. No. 2,309,988 and German Auslegeschrift 1,270,016).

In U.S. Pat. No. 2,049,504, a process is described in which a solution which contains tetravalent titanium and trivalent iron is treated with a Ti(III) salt solution which has been prepared separately by the reduction of a Ti(IV) salt solution. Reduction of the tetravalent titanium is carried out with at least two metals which have an electric potential somewhere between calcium and hydrogen. In this process, the metals are used in a relatively coarse form. Iron alone, especially in a finely divided state, is not suitable.

According to U.S. Pat. No. 2,416,216, sponge iron is used as reducing agent. This can be obtained by treating titanium iron ores with reducing gases or materials which contain carbon.

The action of finely divided iron which has been obtained by reducing finely ground titanium iron ore on a clarified solution containing tetravalent titanium and trivalent iron has also been proposed (U.S. Pat. No. 3,416,885).

Ilmenite decomposition processes which result in solutions having a very high concentration or iron (III) sulfate cannot readily be applied to the working up of titanium slag. It is accordingly an object of the invention to provide titanyl sulfate solutions which are free of trivalent iron.

This and other objects and advantages are realized in accordance with the present invention which provides a process for the treatment of titanium containing slag to prepare sulfuric acid titanyl sulfate solutions which are free from ferric iron by grinding and drying, decomposition with sulfuric acid, separation of solids which have not been decomposed and optionally evaporation of the solution obtained by the decomposition reaction, the decomposition solution being adjusted to a Ti(III) concentration sufficient to prevent the formation of iron (III) ions. In this process the metallic iron contained in the slag is magnetically separated from the gravel returned from a grinding and drying process and is added to a partial stream of the titanyl sulfate solution which has been freed of the decomposition residue, the iron being added in such an amount that the titanium (III) concentration in this partial stream is adjusted to about 50 to 90 g/l, based on the amount of $TiO_2$, and this partial stream is then returned to the entire decomposition solution.

The magnetically separated iron has a particle size of about 40 to 350 microns, preferably about 80 to 180 microns. Its addition to the concentrated Ti(III) salt solution is advantageously controlled by means of the Redox potential measured in the decomposition solution.

Crude slags which contain titanium to an extent of more than about 60 percent to $TiO_2$ may be used as a starting material for the process of the invention. Such slags also contain metallic iron, iron compounds and $SiO_2$ in addition to calcium oxide, magnesium oxide and aluminum oxide.

The slag must first be ground in order to bring the raw material into a form suitable for decomposition. The object of the grinding operation is to obtain a material with optimum particle sizes so that the subsequent decomposition with sulfuric acid will proceed sufficiently rapidly. Grinding the material even more finely is of no advantage in view of the higher energy consumption and loss in efficiency of the grinding mill. It is desired to obtain a particle size distribution having a frequency maximum at about 20 microns.

The grinding may be carried out in tube mills. These mills, which are filled with steel balls, operate on the principle of a rotary sifter mill. The stream of air passed through the mill may be heated, e.g., by an oven, so that it serves at the same time to dry the ground material to a residual moisture content of about 0.1 percent by weight of water.

The material discharged from the mill, e.g., by pneumatic means, need not yet have its final degree of fineness because it will subsequently be separated in a sifter into fine material and grit which is returned to the mill. The fine material which is to be decomposed is separated from the accompanying air in a cyclone and collected in bins. Decomposition of the fine material is then carried out with sulfuric acid in known manner.

For this purpose, concentrated sulfuric acid is added to the finely ground material in large conical tanks. Steam is then directly introduced into this mixture with constant pneumatic stirring until the decomposition reaction starts. Temperatures of between about 200° and 220° C are reached in the course of this reaction. A solution highly acidified with sulfuric acid is obtained by extracting the resulting decomposition cake with water. This solution is then clarified and if desired evaporated to a concentration of about 200 to 280 g of $TiO_2$ per liter. According to the invention, the concentrated Ti(III) sulfate solution is added to the decomposition solution either before or after clarification and filtration. The resulting titanyl sulfate solution may then be subjected to hydrolysis by heat to produce $TiO_2$.

The crude slag used as starting material for the process of the invention still contains 0.6 to 0.9 percent of metallic iron. Since this must be removed before the decomposition with sulfate acid, it is separated magnetically from the non-magnetizable particles of the titanium slag. The proportion by weight of the magnetic fraction based on the quantity of raw material which is to be ground up is between about 0.5 and 1.0 percent. According to the invention, the magnetic separation is carried out in the return flow of grit. The iron separated in this way has a particle size of about 40 to 350 microns, preferably about 80 to 180 microns. Once the flow is established, the metallic iron in the return flow of grit is concentrated to about 6 to 10 times the intial concentration. The magnetic separation may be carried out e.g., by th process of German Patent Specification 735,356.

For magnetic separation, numerous permanent magnets which have segmental pole ends are arranged over a width of 1 m in a horizontal drum made of non-magnetizable material. The drum rotates in the direction of the flow of product while the magnets inside the drum move in the opposite direction at a moderate speed. The mixture containing metallic iron is fed to the drum from a vibrating chute which has a transverse distributing function. The non-magnetizable constituents are thrown off due to the high speed of rotation and return to the mill as grit return flow. The magnetizable iron adheres to the drum until it is removed by a brush roller diametrically opposite to the feed point. The continuous flow of magnetically separated iron into the containers may be monitored, e.g., by electromagnetic means.

According to the invention, the iron obtained in this way (the increase in concentration after the magnetic separation is about 70 to 80 percent of metallic iron from a concentration of about 0.6 to 0.9 percent in the slag) is used for preparing a Ti(III) salt solution by reduction of a Ti(IV) salt solution. These Ti(III) sulphate solutions, which with their high content in Ti(III) ions are resistant to oxidation and hydrolysis for as much as several weeks, have a concentration of about 50 to 90 g/l, preferably about 70 to 80 g/l of reduced titanium compounds, calculated as $TiO_2$.

The titanium (III) sulfate solution is used to reduce any iron (III) sulfate present in the solution obtained from the decomposition of titanium slag, this reduction being carried out either before or after clarification and filtration and in accordance with the following equations:

$$Ti_2(SO_4)_3 + Fe_2(SO_4)_3 + 2 H_2O \longrightarrow 2 TiOSO_4 + 2 FeSO_4 + 2 H_2SO_4$$

and in addition it serves to adjust the decomposition solution to an excess of Ti(III) ions, preferably of about 1 to 2 g/l.

The reduction yield according to the following reaction equations:

$$Fe_2(SO_4)_3 + Fe \longrightarrow 3 FeSO_4 \text{ and}$$

$$2 TiOSO_4 + Fe + 2 H_2SO_4 \longrightarrow Ti_2(SO_4)_3 + FeSO_4 + 2 H_2O$$

was found to be about 60 to 85 percent, calculated from the weight of metallic iron put into the reaction. The iron separated from the return flow of grit obtained from the process of grinding and drying is eminently suitable for the preparation of solutions which contain Ti(III).

For the preparation of the Ti(III) solutions, it is advantageous to use a partial stream of decomposition solution which has been clarified, i.e., freed from solid residue. Since the solutions are adjusted to high concentrations of Ti(III) sulfate, the volume of the partial stream is very small in proportion to the total amount of decomposition solution. About 2 percent by volume to 4 percent by volume are generally sufficient.

The following conditions are especially suitable for the preparation of the Ti(III) salt solution:

The Ti(IV) sulphate solution which is to be reduced should be more dilute than the decomposition solutions. At the end of the reaction, the total amount of trivalent and tetravalent titanium in the reduced solution, calculated as $TiO_2$, should not be higher than about 130 g/l. It is suitable to use already diluted titanium sulphate solutions, for example those obtained by clarification of the decomposition solution. It is advantageous to use the filtrate of the thickener underflow pulp obtained by clarification of the titanium sulfate solutions in an overflow thickener. The wash water used for washing out the separated solids is advantageously combined with the filtrate. In these relatively dilute solutions, the total conversion to trivalent titanium compounds is greater than in more concentrated starting solutions. Moreover, diluting the starting solution ensures that the $FeSO_4$ previously present and that newly formed by the addition of iron cannot so readily crystallize together with the Ti(III) sulfate on subsequent cooling of the solution.

Sulfuric acid is added to the solution which is to be reduced, in order to have a sufficient excess of acid for dissolving the iron. The formation of iron sulfate must not take place at the cost of the free sulfuric acid originally present in the titanium sulfate solution.

Reduction should start at about 30° to 50° C. Temperatures of 60° to 65° C. are reached only subsequently in the course of the reaction as a result of the heat evolved. It is necessary to ensure by suitable control of the addition of iron and if necessary by cooling that a temperature of about 65° C. is not exceeded during the reduction because temperatures above 65° C. considerably promote the evolution of hydrogen.

The particle size distribution of the iron powder added should be adjusted about 40 to 350 microns and preferably about 80 to 180 microns so that the iron will not react spontaneously because in that case the evolution of hydrogen would predominate over the reduction of Ti(IV). On the other hand, the particles must be sufficiently fine to ensure complete chemical solution of the particles within about 10 to 15 minutes after they have been added.

It has been found advantageous to suspend the finely divided iron in water and to pump this suspension into the Ti(IV) sulfate solution which is acidified with sulfuric acid. This method enables the addition of iron to be more easily adjusted and controlled. The particles of iron wetted with water are introduced into the reaction solution about 1 m below the liquid surface by means of an immersion tube which is open to the atmosphere at the top.

By this method, the evolution of hydrogen and hence the loss in yield of reduction product are kept very low in the industrial production of Ti(III) sulfate solution.

The addition of concentrated Ti(III) salt solution is controlled by the Redox potential measured in the decomposition solution.

When measuring the Redox potential during the addition of Ti(III) sulfate to the decomposition solution, the transition from the oxidation potential of Fe(III) ions to the reduction potential of Ti(III) ions registers a jump of several hundred millivolts. The value in millivolts measured by means of a Redox electrode measuring chain, e.g., a platinum electrode with Ag/AgCl electrode as reference electrode, may serve as a measure of the concentration of Fe(III) ions and Ti(III) ions.

It is therefore possible to find the actual value of the content in Fe(III) ions or Ti (III) ions from the measured potential value and to lay down a particular potential value as the nominal value to which the concentration of Ti(III) ions is to be adjusted. These two values of potential may be used to control a regulating mechanism by which the quantity of Ti(III) sulfate solution required is supplied through a regulating valve.

Figure 2:
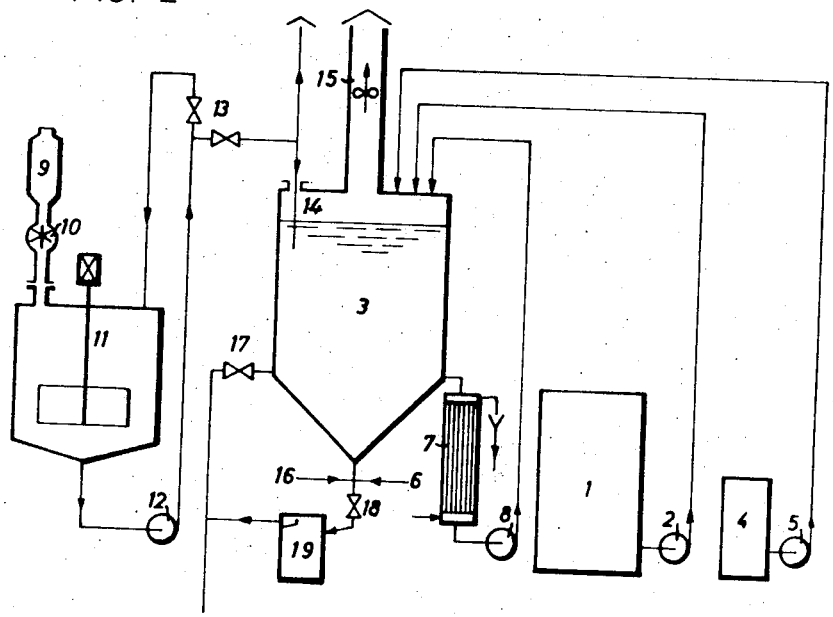
Figure 3:
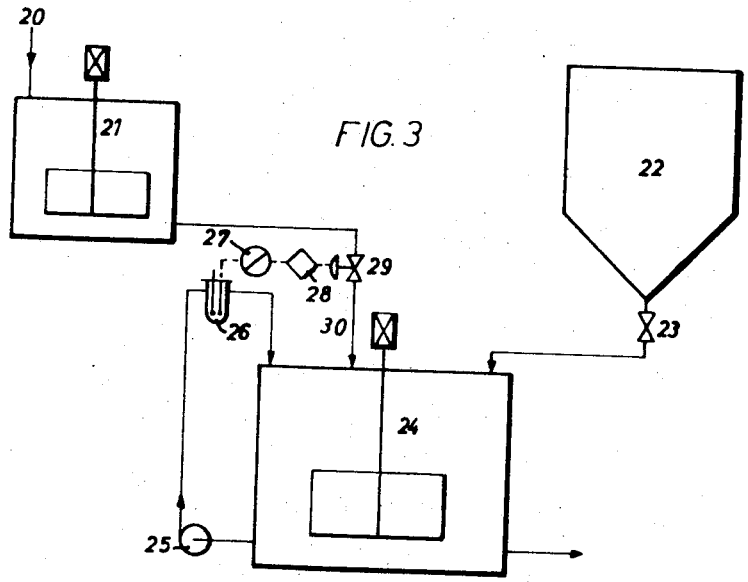

The invention will be further described with reference to the accompanying drawings wherein:

FIG. 1 is a flow sheet of the whole process; in the flow sheet the figures have the following meaning: 101 is the titanium slag, 102 grinding and drying, 103 magnetic separation, 133 separated metallic iron, 113 production of a concentrated Ti(III)-solution, 123 storage tank for the Ti(III)-solution, 143 sulfuric acid for the production of Ti(III)-solution, 153 a partial stream of Ti(IV)-solution, 114 sulfuric acid for the digestion process, 124 water, 104 digestion step, 105 reduction of the Fe(III) and adjustement of the necessary Ti(III)-concentration, 106 clarification and filtration, 107 concentration, 108 thermal hydrolysis and 109 is the final product $TiO_2$;

FIG. 2 is a schematic view of the apparatus for producing a titanyl sulfate solution containing Ti(III) in about 50 to 90 grams per liter; and FIG. 3 is a schematic view of the apparatus for producing a titanyl sulfate solution containing about 0.1 to 4 grams per liter of Ti(III) from decomposition solution and the product of FIG. 2.

In the drawings, the reference numeral 1 (in FIG. 2) denotes a storage bin for dilute Ti(IV) sulfate solution, 3 the reaction vessel, 4 a container for measuring sulfuric acid, 6 and 16 connection pipes through which air or steam may be supplied for pneumatic stirring or heating, 7 a cooler, 9 a storage bin for iron which is supplied to a stirrer vessel 11 by means of a ball valve 10, the reference numerals 13, 17 and 18 represent valves, 2, 5, 8 and 12 represent pumps, 15 a ventilator and 19 a vessel for clarifying the titanium (III) sulfate solution. In FIG. 3, reference numeral 20 represents the supply of concentrated Ti(III) solution, 21 a storage bin, 22 the decomposition tank, 23 a feed pipe into the stirrer vessel 24, 25 a circulating pump, 26 an electrode vessel, 27 a potentiometer, 28 a control apparatus and 29 a regulating valve for the feed pipe 30.

The embodiment of the process of the invention described hereinafter and shown diagrammatically in FIGS. 2 and 3 is particularly suitable.

A certain volume of dilute titanyl sulfate solution (rotary filter filtrate) is delivered into the conical reaction vessel 3 from a storage tank 1 by means of a pump (FIG. 2). Concentrated sulfuric acid, the quantity of which has previously been measured in a separate vessel 4, is then added to the titanyl sulfate solution already in the reaction vessel 3 by means of the pump 5. The reactants are mixed by pneumatic stirring, air being blown in from below through the pipe 6. The heat of dilution produced may be removed in a cooler 7 while the mixture is circulated by means of the pump 8, the reaction mixture being at the same time adjusted to the required starting temperature for the reduction reaction. If on subsequent addition of iron the reaction becomes too vigorous due to increase in temperature, the excess heat of reaction may also be removed during the reduction process by cooling the titanium sulfate solution in the cooler to maintain the required temperature.

The quantity of iron powder required for the reduction is delivered from the storage bin 9 into a stirrer vessel 11 by means of a ball valve 10 and suspended in the given quantity of water in this vessel. Now that it is suspended in water, the iron powder can be pumped and delivered to the titanyl sulfate solution by means of a double channel gear wheel pump 12. By appropriately setting the valves 13, the quantity of iron supplied can be accurately controlled. The suspension flows in through the immersion tube 14 which is open at the top. A ventilator 15 prevents accumulation of any hydrogen formed in the reaction vessel so as to ensure vigorous suction. The concentration of hydrogen is constantly controlled by measuring instruments. Steam may be supplied together with the air for pneumatic stirring through the pipes 16 in order to increase the temperature of the reaction mixture if necessary. After the solution has been reduced and clarified by sedimentation, it enters a storage tank for concentrated Ti(III) sulfate solution through a conduit and valve 17. The lower part of the contents of the conical container is discharged through the valve 18, and the clear solution is separated from it by decanting in a separate vessel 19. While clarified Ti(III) sulfate solution flows over to the storage tank, solid residue which cannot be used settles in the lower part of this vessel and can be carried away in it.

The concentrated titanium (III) sulfate solution enters the storage tank 21 from a reaction vessel (e.g., reaction vessel 3 of FIG. 2) through the overflow 20 (FIG. 3). The solution obtained after sulfuric acid decomposition of the titanium slag from which iron was magnetically separated is discharged from the decomposition tank 22 into the stirrer vessel 24 through the pipe 23. After the inflow of the decomposition solutions which are obtained intermittently, this stirrer vessel also serves as storage vessel from which overflow thickeners can be continuously supplied with production solution. At the same time, a very small partial stream of the solution is continuously pumped from the stirrer vessel 24 through the electrode vessel 26 by means of the pump 25. This electrode vessel contains a platinum electrode with an Ag/AgCl electrode as reference electrode.

The Redox potential of the solution is determined by connecting the electrode to a potentiometer 27. When the Redox potential differs from the nominal value, the governor 28 opens the control valve 29 so that the appropriate quantity of titanium (III) sulfate solution can flow from the container 21 into the stirrer vessel 24 through the pipe 30. This process continues until sufficient Ti(III) sulfate solution has been added and the Ti(III) ion concentration has reached the required value and the Redox potential has been adjusted to the nominal value. Decomposition solutions continuously and intermittently entering the stirrer vessel are thus adjusted to the required Ti(III) ion concentration by this regulating mechanism. Even higher accuracy in the adjustment of the concentration of Ti(III) ions can be achieved if about 90 percent of the quantity of Ti(III) sulfate solution which is required according to the Redox potential is introduced into a first intermediate vessel and the remaining approximately 10 percent are introduced into a second intermediate container. By this method, the decomposition solution can be adjusted to an accuracy of 0.1 g/l of trivalent titanium calculated as $TiO_2$.

The effluent from vessel 24 is then sent to the overflow thickeners (not shown), a portion thereof being withdrawn and sent to vessel 1 for producing adiditonal titanium (III).

This process is shown schematically in the flow sheet of FIG. 1, along with an alternative shown in broken lines. In the alternative, the sulfuric acid solution of titanyl sulfate obtained by decomposition of the relatively iron-free slag can be diluted and a portion thereof sent to the vessel wherein the reactions with the iron takes place in order to produce Titanium(III), this portion replacing the portion sent from the clarifier in whole or in part. Since in this broken-line alternate clarification is carried out before adjustment of the Ti (III) content, subsequent clarification can be omitted and the solution directly passed to hydrolysis as shown in broken lines at the lower left.

The process explained above provides the following advantages:

Magnetic separation of metallic iron prevents the dangerous evolution of hydrogen when titanium slag is decomposed with sulfuric acid. By using the otherwise useless iron-containing magnetic fraction separated from the titanium slag for the reduction, a saving in iron raw material is achieved.

The higher reduction yield in the separate reaction vessel and the automatic adjustment of the Ti(III) concentration which is accurate to 0.1 g/l result in a low consumption of reducing agent so that combined with the magnetically separated iron, the use of iron raw material is reduced to one-third to one-fourth compared with previous methods. Furthermore, by effecting the reduction with iron scrap in a single decomposition vessel rather than in multiple vessels, the number of pieces of equipment which are liable to need repair is minimized and the decomposition capacity is increased by about 15 percent.

Complete closure of the decomposition vessels is a necessary condition for considerably reducing the quantities of waste gas. Purification of the waste gases in a washing tower is thereby considerably facilitated.

The titanyl sulfate solutions prepared by the process described are eminently suitable for the preparation of $TiO_2$ which has very good pigment properties.

The process according to the invention will now be described in more detail with the aid of the following examples.

EXAMPLE 1

Preparation of a concentrated Ti(III) sulfate solution (Laboratory preparation)

25 g of a fraction which has been magnetically separated from ground titanium slags were added in the course 1 hour to a mixture of 300 cc of rotary filter filtrate from the decomposition plant, 40 cc of concentrated $H_2SO_4$ and 50 cc of $H_2O$ with stirring. The proportion of metallic Fe was 74 percent, the particle size between 40 and 120 microns. At the end of the reaction, the amount of solution was 380 cc; there was a slight loss in volume due to evaporation. On analysis, the solution was found to be composed as follows:

| | |
|---|---|
| Ti (total) in terms of $TiO_2$ | 121 g/l |
| Ti (trivalent) in terms of $TiO_2$ | 83 g/l |
| $H_2SO_4$ (free and bound) | 440 g/l |
| $FeSO_4$ | 179 g/l |
| Conversion to $Ti^{3+}$ | 69% |
| Yield based on Fe metal | 60% |

EXAMPLE 2

The following quantities were put through the mill used for continuous grinding and drying of titanium slag:

| | |
|---|---|
| Crude slag introduced into the apparatus | 330 000 kg |
| Ground material obtained in particles of < 40 microns | 328 000 kg |
| Magnetically separated fraction 80–180 microns | 2 000 kg |

The ground material contained less than 0.2 percent Fe. Analysis of the magnetic fraction was as follows:

| | |
|---|---|
| Fe metal | 66.5% |
| FeO | 15.2% |
| $TiO_2$ | 14.4% |
| Remainder | 3.9% |

The magnetically separated 2,000 kg with 1,330 kg of Fe metal were suspended in 7.7 m³ of water which was also necessary for the subsequent reaction as water of dilution. This iron suspension was pumped in the course of one hour through the immersion tube into the solution which was prepared as follows:

24.5 m³ of filtrate of the rotary filter were mixed with 4 m³ of concentrated sulfuric acid in the reaction vessel, 28 m³ of a solution of the following composition being obtained:

| | |
|---|---|
| Ti (total) in terms of $TiO_2$ | 160 g/l |
| Ti (trivalent) as $TiO_2$ | <1 g/l |
| $H_2SO_4$ (free and bound) | 565 g/l |
| $FeSO_4$ | 64 g/l |

The reaction took place with vigorous pneumatic stirring and the temperature rose from 47° to 62° C. After a brief restirring and sedimentation of the unreacted particles 36 m³ of a clear solution were obtained which was composed as follows:

| | |
|---|---|
| Ti (total) in terms of $TiO_2$ | 125 g/l |
| Ti (trivalent) in terms of $TiO_2$ | 87 g/l |
| $H_2SO_4$ (free and bound) | 425 g/l |
| $FeSO_4$ | 146 g/l |

During the whole reaction, the concentration of hydrogen in the discharged air from the stirrer did not rise above 2%. The conversion was 70 percent and the reduction yield 82 percent. The fact that the iron powder had been wetted with water and the introduction of the iron into the reaction liquid through the immersion tube were reflected advantageously in the reduction yield.

When 10,000 kg of titanium slag, for example, were decomposed with sulfuric acid, 28.5 m³ of titanium sulfate solution were obtained after the addition of water of solution to the decomposed sulfates. 0.8 m³ of the concentrated Ti(III) sulfate solution described above was added through a regulating device to adjust the concentration of Ti(III) ions in the decomposition solution to the nominal value. The appropriate analyses show the following results:

| | Before addition | After Addition to the decomposition solution |
|---|---|---|
| Ti (total in terms of $TiO_2$ | 235 g/l | 232 g/l |
| Ti (trivalent) in terms of $TiO_2$ | | 1.4 g/l |
| Fe (total) in terms of $FeSO_4$ | 92 g/l | 94 g/l |
| $Fe^{3+}$ in terms of $Fe_2(SO_4)_3$ | 2 g/l | |
| $H_2SO_4$ (free and bound) | 524 g/l | 521 g/l |

The consumption of concentrated Ti(III) sulfate solution was 1.12 times the theoretical amount.

EXAMPLE 3

A Ti(III) sulfate solution prepared commercially and having the following composition:

| | |
|---|---|
| Ti (total) in terms of $TiO_2$ | 130 g/l |
| Ti (trivalent) in terms of $TiO_2$ | 75 g/l |
| $H_2SO_4$ (free and bound) | 450 g/l |
| $FeSO_4$ | 150 g/l | was used to reduce the trivalent iron in decomposition solutions of titanium slag and to adjust the concentration of $Ti^{3+}$ ions to the value required for carrying out a trouble-free hydrolysis.

20 cc of the above Ti(III) sulfate solution were added to 500 cc of a solution obtained from the process of decomposition of titanium slag (Time: 2 minutes):

| | Analysis before | Analysis after |
|---|---|---|
| Ti (total) in terms of $TiO_2$ | 236 g/l | 235 g/l |
| Ti (trivalent) in terms of $TiO_2$ | | 1.6 g/l |
| Fe (total) in terms of $FeSO_4$ | 89 g/l | 92 g/l |
| $Fe^{3+}$ in terms of $Fe_2(SO_4)_3$ | 3 g/l | |
| $H_2SO_4$ free and bound | 520 g/l | 517 g/l |

It will be appreciated that the instant specification and examples are set forth by way of illustration and not limitation, and that various modifications and changes may be made without departing from the spirit and scope of the present invention.

What is claimed is:

1. In the preparation of a sulfuric acid-containing solution of titanyl sulfate wherein a titanium- and iron-containing slag is ground, decomposed with sulfuric acid and separated from undissolved decomposition residue, the improvement which comprises magnetically separating from the ground slag iron of a particle size of about 40 to 350 microns, withdrawing from the main body of the sulfuric acid-containing solution of titanyl sulfate a portion thereof, adding to the withdrawn portion the magnetically separated iron while maintaining a maximum temperature of about 65° C, whereby the reaction between iron and sulfuric acid serves to reduce titanium IV in the withdrawn portion to titanium (III), the relative proportions of iron and titanyl sulfate solution being such that the titanium (III) concentration in the resulting reduced solution is from about 50 to 90 grams per liter calculated as $TiO_2$, and adding said reduced solution to the main body of the sulfuric acid-containing titanyl sulfate solution in amount to provide a titanium (III) content of 0.1 to 4 grams per liter calculated as $TiO_2$, whereby if any iron II is present in said main body of the solution it is prevented from going to trivalent state.

2. Process according to claim 1, wherein the magnetically separated iron is suspended in water, and the aqueous suspension of iron is added to the withdrawn portion of the sulfuric acid-containing solution of titanyl sulfate.

3. Process according to claim 2, wherein the aqueous iron suspension is introduced into the titanyl sulfate solution below the surface of the solution.

4. Process according in claim 3, wherein the magnetically separated iron has a particle size between about 80 and 180 microns.

5. Process according to claim 1, wherein the addition of the reduced solution is controlled by the Redox potential measured in the main body of the titanyl sulfate solution.

6. Process according to claim 4, wherein the addition of the reduced solution is controlled by the Redox potential measured in the main body of the titanyl sulfate solution, the Redox potential being set to provide a titanium (III) content of 1.3 to 1.6 grams per liter calculated as $TiO_2$.

* * * * *